(12) United States Patent
Serafimovich et al.

(10) Patent No.: US 7,746,414 B2
(45) Date of Patent: Jun. 29, 2010

(54) ILLUMINATION SYSTEM ELIMINATING LASER SPECKLE AND PROJECTION TV EMPLOYING THE SAME

(75) Inventors: Pavel Serafimovich, Suwon-si (KR); Sungha Kim, Seoul (KR); Byoungho Cheong, Seoul (KR); Sangwhoe Dho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 664 days.

(21) Appl. No.: 11/223,997

(22) Filed: Sep. 13, 2005

(65) Prior Publication Data

US 2006/0109386 A1    May 25, 2006

(30) Foreign Application Priority Data

Nov. 19, 2004   (KR)   ............... 10-2004-0095049

(51) Int. Cl.
*H04N 9/31* (2006.01)
(52) U.S. Cl. ............... 348/744; 348/756; 348/760
(58) Field of Classification Search ......... 348/744–747, 348/756–757, 760–761, 790–791; 359/622, 359/634, 707, 242–245
See application file for complete search history.

(56) References Cited

U.S. PATENT DOCUMENTS

| | | | |
|---|---|---|---|
| 4,918,469 A | 4/1990 | McGrew | |
| 6,323,984 B1 | 11/2001 | Trisnadi | |
| 6,594,090 B2 * | 7/2003 | Kruschwitz et al. | 359/707 |
| 6,688,758 B2 | 2/2004 | Thibault | |
| 6,744,502 B2 * | 6/2004 | Hoff et al. | 356/317 |
| 7,128,420 B2 * | 10/2006 | Kapellner et al. | 353/38 |
| 7,244,028 B2 | 7/2007 | Govorkov et al. | |
| 7,355,657 B2 | 4/2008 | Chilla et al. | |
| 7,379,651 B2 | 5/2008 | Abu-Ageel | |
| 2003/0227684 A1 | 12/2003 | Goto | |
| 2004/0160998 A1 | 8/2004 | Gruhlke et al. | |
| 2006/0012842 A1 | 1/2006 | Abu-Ageel | |
| 2006/0109386 A1 | 5/2006 | Serafimovich et al. | |
| 2007/0273957 A1 | 11/2007 | Zalevsky et al. | |

FOREIGN PATENT DOCUMENTS

KR   2003-0003273 A   1/2003

* cited by examiner

*Primary Examiner*—Trang U Tran
(74) *Attorney, Agent, or Firm*—Sughrue Mion, PLLC

(57) ABSTRACT

Provided are an illumination system, a projection TV employing the illumination system, and a projection method. The illumination system includes: a laser light source which emits a plurality of laser beams including beamlets along different optical axes; and a diffractive optical element which spatially averages the laser beamlets by superimposing the laser beamlets to remove speckles of the laser beamlets and which shapes each of the laser beamlets.

10 Claims, 5 Drawing Sheets
(3 of 5 Drawing Sheet(s) Filed in Color)

ILLUMINATION SYSTEM ELIMINATING LASER SPECKLE AND PROJECTION TV EMPLOYING THE SAME

CROSS REFERENCE TO RELATED PATENT APPLICATION

This application claims the priority of Korean Patent Application No. 10-2004-0095049, filed on Nov. 19, 2004, in the Korean Intellectual Property Office, the disclosure of which is incorporated herein in its entirety by reference.

BACKGROUND OF THE INVENTION

1. Field of the Invention

The present invention relates to an illuminating system designed to eliminate speckles of laser light and a projection TV employing the same, and more particularly, to an illumination system designed to efficiently reduce or eliminate laser speckles by spatially averaging laser beams using a diffractive optical element and a projection TV employing the same.

2. Description of the Related Art

A projection TV using a laser light source unit is capable of providing a wide range of color expression and has a small divergence angle and high optical efficiency due to a superior collimating property, and thus can have a small size. However, in addition to these advantages, projection televisions utilizing laser light sources suffer from speckles of laser light due to the coherency of the laser light. Speckles of laser light are generated due to the interference with an arbitrary phase when coherent beams are reflected from a rough surface. Such speckles of laser light are the main factor in the degradation of the resolution and of the quality of images.

U.S. Pat. No. 6,594,090 discloses a conventional projector that can remove laser speckles.

Referring to FIG. 1, the conventional projector includes a laser light source 20, a beam expanding optical unit 24, a diffuser 34, and a beam shaping optical unit 38, which are coaxially arranged. The beam expanding optical unit 24 includes a diverging lens 26 and a collimating lens 30. The beam shaping optical unit 38 includes a fly's eye integrator 40, a condenser lens 44, and a field lens 46.

The beam expanding optical unit 24 expands beams emitted from the laser light source 20 into collimated beams with larger diameters. The beam shaping optical unit 38 shapes the beams with Gaussian distributions to have uniform intensity distributions by overlapping the expanded beams and adjusts the shapes of the beams to match with the shape of a liquid-crystal spatial light modulator 52. The beam reflected by the liquid-crystal spatial light modulator 52 is reflected by a polarizing beam splitter 50 and is enlarged and projected onto a screen 60 by a projection lens 58, so that an image is displayed on the screen 60.

In the conventional structure, the beams diffused by the diffuser 34 are radiated by the beam shaping optical unit 38 toward the spatial light modulator 52 such that they overlap, thereby eliminating laser speckles. However, eliminating laser speckles only using the diffuser 34 as described above results in low speckle removing efficiency and a degraded image quality.

SUMMARY OF THE INVENTION

The present invention provides a slim and compact illumination system using a laser light source unit that can effectively reduce or eliminate laser speckles using a diffractive optical element, and a projection TV employing the same.

According to an exemplary aspect of the present invention, there is provided an illumination system comprising: a laser light source which emits a plurality of laser beams including beamlets along different optical axes; and a diffractive optical element which spatially averages the laser beamlets by superimposing the laser beamlets to remove speckles of the laser beamlets and which shapes each of the laser beamlets.

The laser beamlets may be emitted from the laser light source unit parallel to each other and may be respectively focused on different regions of the diffractive optical element.

The diffractive optical element may diffract the laser beamlets at different angles according to the wavelengths of the beamlets to form off-axis images.

The laser beams may be respectively focused onto different segments of the diffractive optical element, and each of the segments of the diffractive optical element may have a unique diffraction pattern.

According to another aspect of the present invention, there is provided a projection TV comprising: a laser light source which emits a plurality of laser beams including beamlets along different optical axes; a diffractive optical element which spatially averages the laser beamlets by overlapping the laser beamlets to remove speckles of the laser beamlets and which shapes each of the laser beamlets; a display device which forms images using the laser beamlets that have passed through the diffractive optical element; and a projection lens which enlarges and projects the images onto a screen.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The above and other features and advantages of the present invention will become more apparent with reference to the following detailed description with reference to the attached drawings in which.

DETAILED DESCRIPTION OF THE INVENTION

Figure 1:
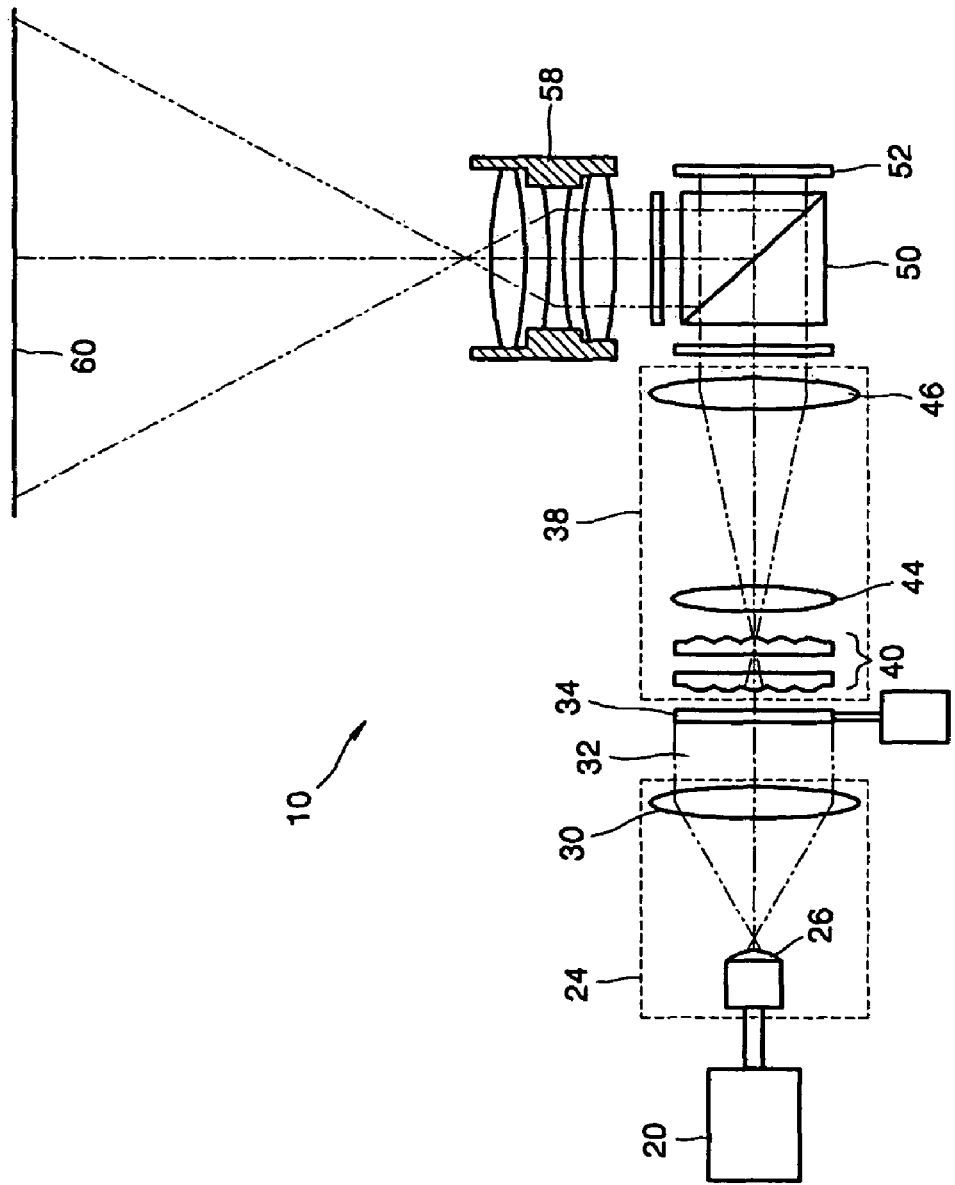
FIG. 1 illustrates a conventional projector disclosed in U.S. Pat. No. 6,594,090.
Figure 2:
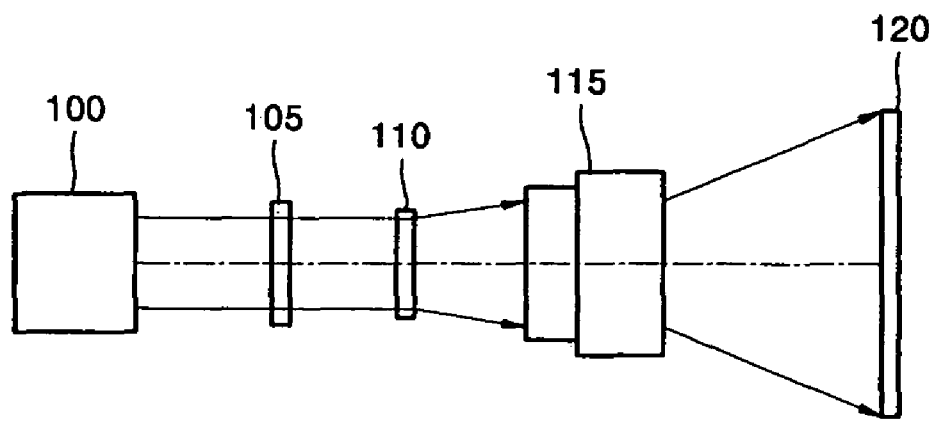
FIG. 2 is a schematic diagram illustrating a structure of a projection TV according to an exemplary embodiment of the present invention.

Referring to FIG. 2, a projection TV capable of removing laser speckles according to an exemplary embodiment of the present invention includes a laser light source unit 100 emitting a plurality of laser beams, a diffractive optical element 105, which can remove speckles of the laser beams emitted from the laser light source unit 100, and a display device 110 which displays an image by spatially modulating incident beams. The projection TV also includes a projection lens unit 115 which enlarges and projects the image produced by the display device 110 onto a screen 120. A refractive lens (not shown) may be further arranged next to the diffractive optical element 105. The refractive lens adjusts the sizes of beamlets entering the display device 110 to improve image quality. A focal length of the refractive lens is adjusted such that a uniform image can be formed by the display device 110.

Figure 3:
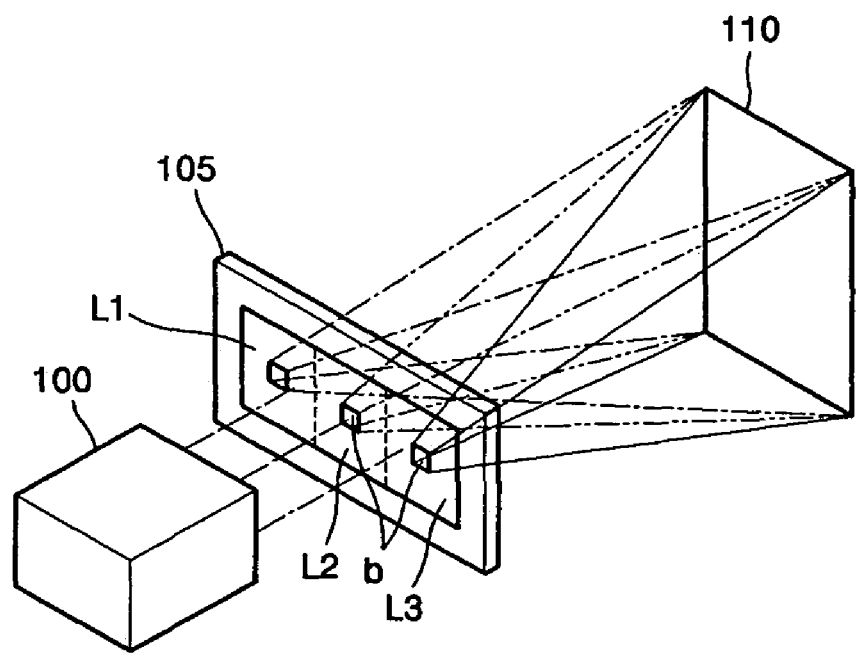
FIG. 3 illustrates an illumination system according to an exemplary embodiment of the present invention.

The laser light source unit 100 emits a plurality of laser beams having different wavelengths respectively along different optical axes to be focused on segments of the diffractive optical element 105. Referring to FIG. 3, the laser light source unit 100 emits, for example, a first laser beam L1, a second laser beam L2, and a third laser beam L3 parallel to each other to be respectively focused on a first segment, a second segment, and a third segment of the diffractive optical element 105. For example, the first, second, and third laser beams L1, L2, and L3 can be red, green, and blue beams, respectively. In FIG. 3, the first, second, and third segments of the diffractive optical element 105 are denoted by the same reference numerals as the first, and second, and third laser beams L1, L2, and L3, respectively. The plurality of laser beams are focused on the different segments of the diffractive optical element 105, and each of the segments of the diffractive optical element 105 has a unique diffraction pattern. The diffraction patterns of the segments are designed so as to optimize the diffraction efficiencies of light of colors.

The diffractive optical element 105 shapes the incident beams such that a cross-section of each of the beams matches the shape of the display device 110. The diffraction optical element 105 spatially averages the incident beams by overlapping the incident beams on the display device 110, thereby eliminating speckles of the laser beams. In other words, the beams incident on the diffractive optical element 105 include multiple beamlets b, and each of the beamlets b is shaped to correspond to the shape of the display device 110 so that the beamlets b overlap on the display device 110. As a result, the beams are spatially averaged, thereby markedly removing or eliminating speckles of the laser beams.

Figures 4A, 4B:
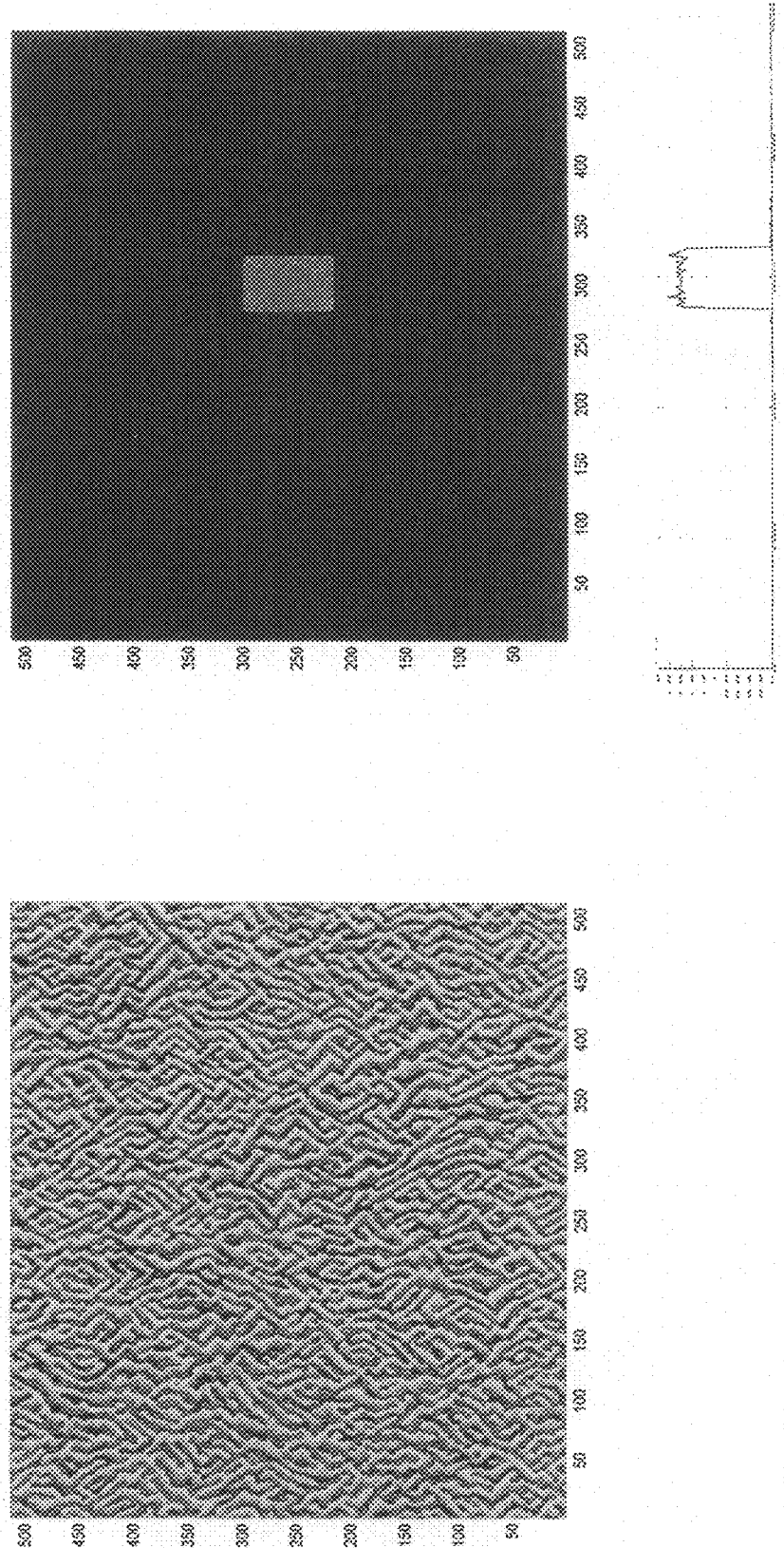
FIG. 4A shows a fragment for a red segment of a diffractive optical element in an exemplary projection TV according to the present invention.
FIG. 4B illustrates an exemplary beam image formed by the fragment for the red segment in FIG. 4A and the light intensity distribution of the beam image.

FIG. 4A illustrates a fragment of a diffractive optical element corresponding to the red segment L1. The fragment has 512*512 pixels for 83*47 beamlets, a RMS of 3.1%, and a diffraction efficiency of 90.0%. FIG. 4B illustrates an image focused on the display device 110 via the fragment of the diffractive optical element 105 shown in FIG. 4A and a light intensity distribution in the image. The light intensity distribution, which appears as a rectangular pattern, is almost uniform.

Figures 5A, 5B:
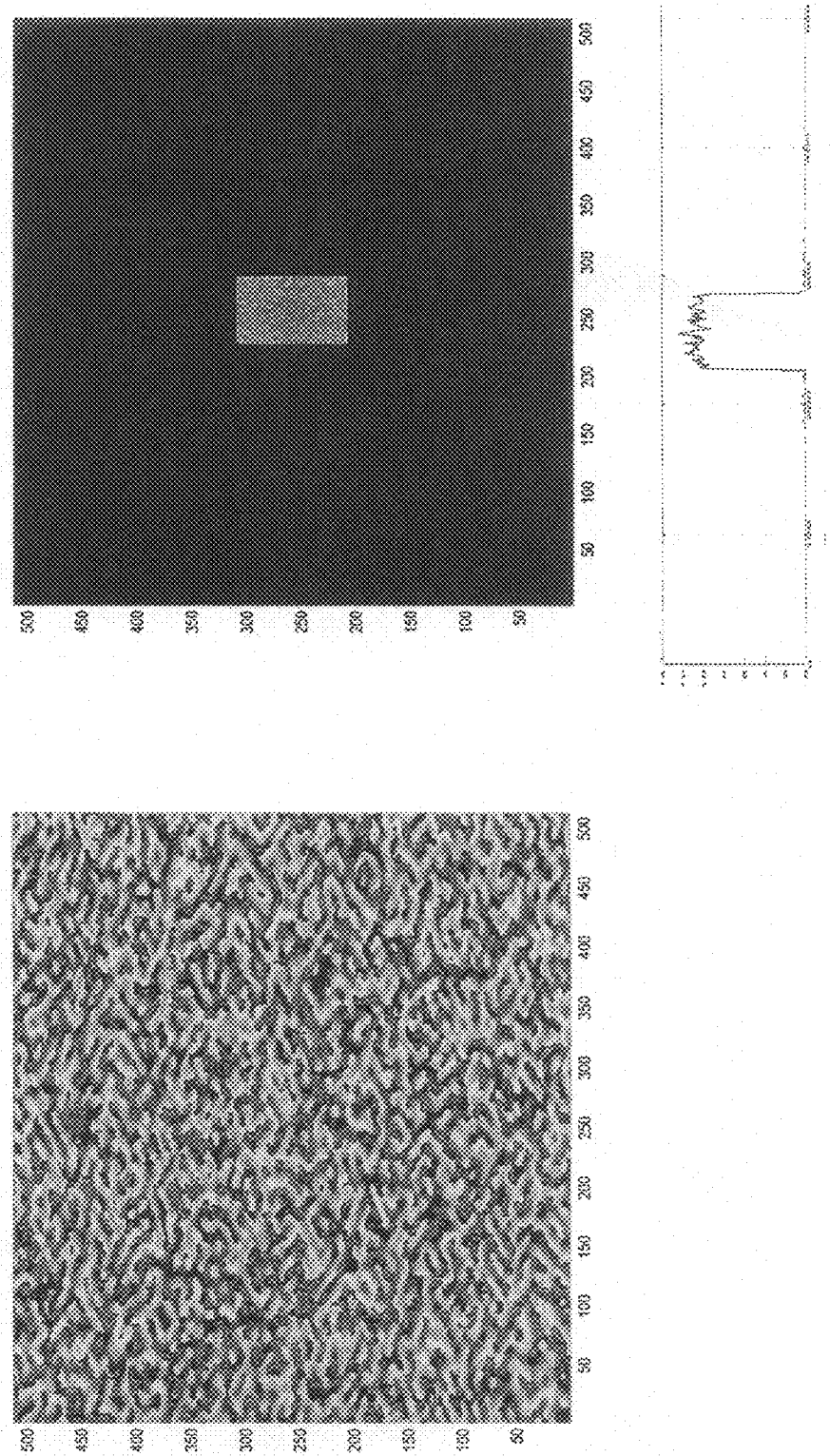
FIG. 5A shows an exemplary fragment for a green segment of a diffractive optical element in the projection TV according to the present invention.
FIG. 5B illustrates an exemplary beam image formed by the fragment for the green segment in FIG. 5A and the light intensity distribution of the beam image.

FIG. 5A illustrates a fragment of a diffractive optical element corresponding to the green segment L2. The fragment has 512*512 pixels for 101*59 beamlets, a RMS of 3.0%, and a diffraction efficiency of 90.0%. FIG. 5B illustrates an image focused on the display device 110 via the fragment of the diffractive optical element 105 shown in FIG. 5A and a light intensity distribution in the image. The light intensity distribution, which appears as a rectangular pattern, is almost uniform.

Figures 6A, 6B:
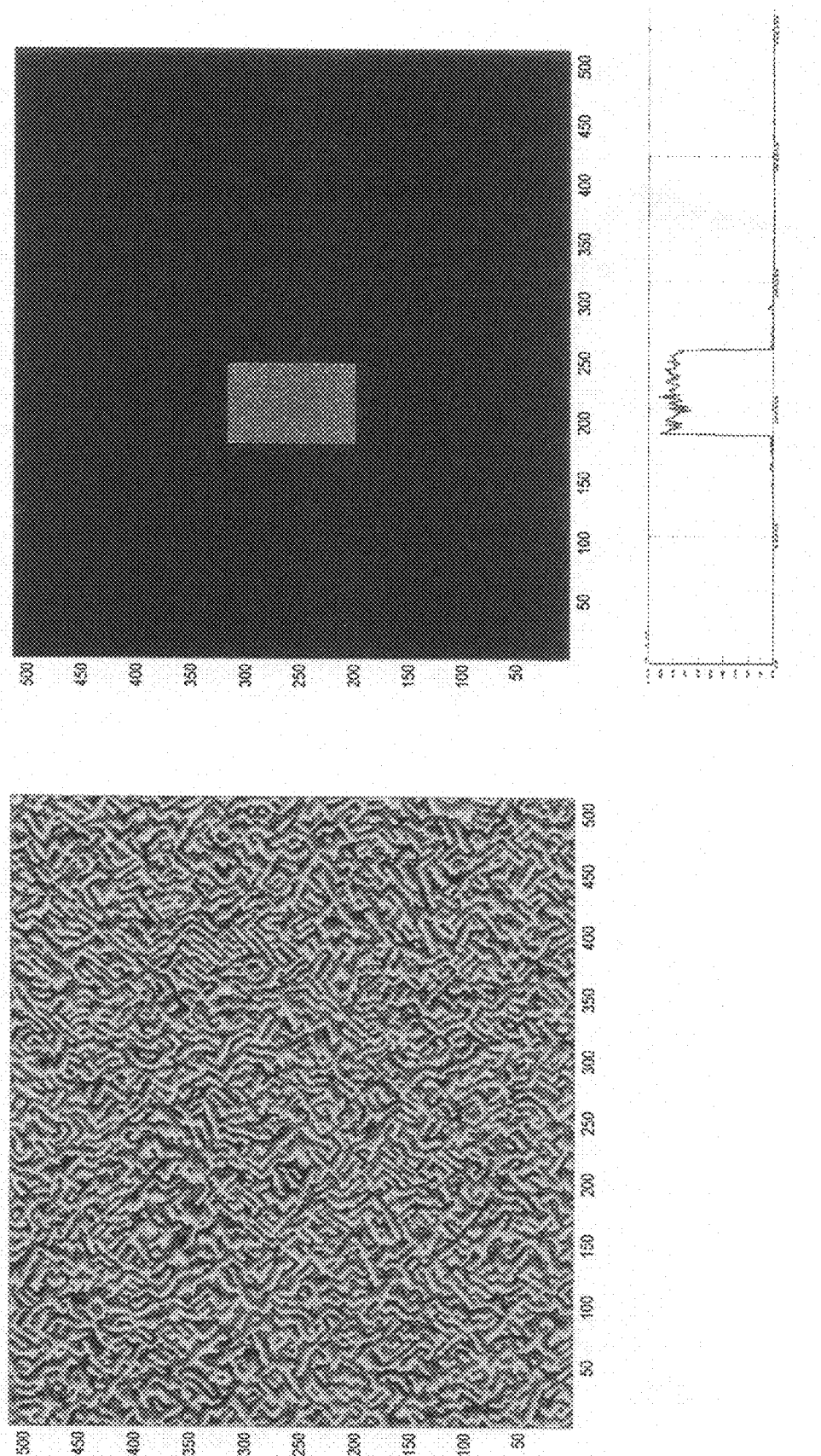
FIG. 6A shows an exemplary fragment for a blue segment of a diffractive optical element in the projection TV according to the present invention.
FIG. 6B illustrates an exemplary beam image formed by the fragment for the blue segment in FIG. 6A and the light intensity distribution of the beam image.

FIG. 6A illustrates a fragment of a diffractive optical element corresponding to the blue segment L3. The fragment has 512*512 pixels for 117*67 beamlets, a RMS of 3.2%, and a diffraction efficiency of 90.0%. FIG. 6B illustrates an image focused on the display device 110 via the fragment of the diffractive optical element 105 shown in FIG. 6A and a light intensity distribution in the image. The light intensity distribution, which appears as a rectangular pattern, is almost uniform.

The fragments of the diffractive optical element 105 are designed to have optimal refractive angles and divergent angles according to the wavelengths of incident laser beams so that the laser beams can be received by the display device 110 with high efficiency. The diffractive optical element 105 accurately focuses red, green, and blue beams onto the display device 110 based on an off-axis image technology of diffracting incident beams at angles according to the wavelengths thereof. Thus, the laser beams are spatially averaged by the diffractive optical element 105 so that speckles of the laser beams are effective removed.

The contrasts of laser speckles are expressed by Equation (1) below. When the contrast of a laser speckle is 4% or less, the laser speckle is invisible.

$$C = \frac{\sqrt{<I_i^2> - <I_i>^2}}{<I_i>} = \frac{\sigma}{\mu} \times 100\, (\%) \tag{1}$$

where $I_i$ is an average intensity of a beam passing through an i-th pixel of the diffractive optical element, $\sigma$ is the standard deviation of the intensity values, and $\mu$ is the mean value of the intensity values. The beams with Gaussian distributions emitted from the laser light source unit 100 are converted into beams with uniform (square) intensity distributions as they pass through the diffractive optical element 105. The diffractive optical element 105 converts the Gaussian beams into uniform intensity beams by focusing the beams onto the display device 110 where the uniform intensity beams overlap. As a result, a laser speckle-free, high quality image can be obtained.

Also, the diffractive optical element 105 shapes the cross-section of the beam to match the shape of the display device 110. The display device 110 may be a transmissive liquid crystal display (LCD), a liquid crystal on silicon (LCoS) display, a deformable micromirror device (DMD), a grating light valve (GLV), or another display device as would be understood by one of skill in the art. The display device 105 has a rectangular shape with an aspect ratio of 4:3 or 16:9. To achieve high optical efficiency, a beam having a circular cross-section emitted from the laser light source unit 100 may be shaped to match the shape of the display device 110. Thus, the laser beams emitted from the laser light source unit 100 are shaped such that, after passing through the diffractive optical element 105, they match the shape of the display device 115.

The diffractive pattern of the diffractive optical element 105 can be varied to control the divergence angle of an incident beam. By controlling the divergence angle of the incident beam in such a way to increase the F-number of an illumination system, a small-sized projection TV can be manufactured. The beams shaped by the diffractive optical element 105 are incident on the display device 110, and an image produced by the display device 110 is enlarged and projected onto the screen 125 by the projection lens unit 115.

The laser light source unit 100 includes a plurality of lasers which simultaneously emit parallel color beams with different wavelengths. For example, the laser light source unit 100 may include first through third lasers respectively emitting red, green, and blue beams. The red, green, and blue beams are simultaneously focused onto the display device 110, which is a 3-panel type display device, using the diffractive optical element 105, based on an off-axis image technology, to form monochromic images of the three colors and are projected onto the screen 120 to form a multi-color image.

According to the present invention, an illumination system that can markedly reduce or eliminate speckles of laser beams is used as a laser light source unit, and a higher-quality projection TV employing the illumination system is provided. In the present invention, since speckles of laser beams are reduced using only one diffraction optical element, which is installed in the illumination system, the optical system can be easily designed without a complicated optical axis alignment process.

According to the present invention, by minimizing the divergence of a beam using the laser light source unit, a compact and slim projection TV can be manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illumination system comprising:
    a laser light source which emits a plurality of laser beams including beamlets and having different wavelengths along different optical axes; and
    a diffractive optical element which spatially averages the laser beamlets by superimposing the laser beamlets on a display device to remove speckles of the laser beamlets, and which shapes each of the laser beamlets to have a cross-sectional shape matching the cross-sectional shape of the display device,
    wherein the diffractive optical element has fragments corresponding to the different wavelengths of the plurality of laser beams.

2. The illumination system of claim 1, wherein the laser beamlets are emitted from the laser light source unit parallel to each other and are respectively focused on different regions of the diffractive optical element.

3. The illumination system of claim 1, wherein the diffractive optical element diffracts the laser beamlets at different angles according to the wavelengths of the beamlets to form off-axis images.

4. The illumination system of claim 1, wherein the laser beams are respectively focused onto the fragments of the diffractive optical element, and each of the fragments of the diffractive optical element has a unique diffraction pattern.

5. A projection TV comprising:
    a laser light source which emits a plurality of laser beams including beamlets and having different wavelengths along different optical axes;
    a diffractive optical element which spatially averages the laser beamlets by overlapping the laser beamlets to remove speckles of the laser beamlets;
    a display device which forms images using the laser beamlets that have passed through the diffractive optical element; and
    a projection lens unit which enlarges and projects the images onto a screen,
    wherein the diffractive optical element overlaps the laser beamlets on the display device, and shapes each of the laser beamlets to have a cross-sectional shape matching the cross-sectional shape of the display device, and
    wherein the diffractive optical element has fragments corresponding to the different wavelengths of the plurality of laser beams.

6. The projection TV of claim 5, wherein the laser beamlets are emitted from the laser light source unit parallel to each other and are respectively focused on different regions of the diffractive optical element.

7. The projection TV of claim 5, wherein the diffractive optical element diffracts the laser beamlets at different angles according to the wavelengths of the beamlets to form off-axis images.

8. The projection TV of claim 5, wherein the laser beamlets are respectively focused onto the fragments of the diffractive optical element, and each of the fragments of the diffractive optical element has a unique diffraction pattern.

9. The projection TV of claim 5, wherein the display device is one selected from the group consisting of a transmissive liquid crystal display, a liquid crystal on silicon display, a deformable micromirror device, and a grating light valve.

10. A projection method comprising:
    emitting a plurality of laser beams including beamlets and having different wavelengths along different optical axes from a laser light source;
    focusing each of the laser beamlets on a different diffraction pattern of a diffractive optical element;
    spatially averaging the laser beamlets;
    superimposing the laser beamlets on a display device;
    shaping each of the plurality of laser beamlets to have a cross-sectional shape matching the cross-sectional shape of the display device;
    forming images using the laser beamlets that have passed through the diffractive optical element and have become incident on the display device; and
    enlarging and projecting the images onto a screen,
    wherein the diffractive optical element has fragments corresponding to the different wavelengths of the plurality of laser beams.

* * * * *